United States Patent
Peddi et al.

(10) Patent No.: US 12,506,431 B2
(45) Date of Patent: Dec. 23, 2025

(54) ENHANCED DISTURBANCE REJECTION WITH NOISE IMMUNITY IN A CURRENT CONTROLLED ALTERNATING CURRENT MACHINE WITH USE OF CURRENT OBSERVER

(71) Applicant: GM Global Technology Operations LLC, Detroit, MI (US)

(72) Inventors: Vinod Chowdary Peddi, Shelby Township, MI (US); Anmol Aggarwal, Waterford, MI (US); Michael Mayberry, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 18/543,299

(22) Filed: Dec. 18, 2023

(65) Prior Publication Data

US 2025/0202393 A1    Jun. 19, 2025

(51) Int. Cl.
   *H02P 21/22*   (2016.01)
   *B60L 15/08*   (2006.01)
   (Continued)

(52) U.S. Cl.
   CPC .............. *H02P 21/22* (2016.02); *B60L 15/08* (2013.01); *H02P 21/0003* (2013.01);
   (Continued)

(58) Field of Classification Search
   CPC ...... H02P 21/00; H02P 21/0003; H02P 21/05; H02P 21/13; H02P 21/14; H02P 21/22; H02P 21/20; H02P 21/34; H02P 23/12; H02P 23/07; H02P 27/06; H02P 27/08; H02P 2207/05; H02P 2205/01; H02P 2205/05; H02P 25/032; H02P 6/10; B60L 15/08; B60L 2240/423; B60L 2240/427;
   (Continued)

(56) References Cited

U.S. PATENT DOCUMENTS

| | | |
|---|---|---|
| 10,097,120 B2 | 10/2018 | Pramod et al. |
| 11,271,503 B2 | 3/2022 | Endo et al. |
| 2019/0389505 A1* | 12/2019 | Pramod ..................... H02P 6/17 |

OTHER PUBLICATIONS

German Office Action for German Application No. 102024103339.8; dated Jul. 10, 2025; 5 pages.

* cited by examiner

*Primary Examiner* — Antony M Paul
(74) *Attorney, Agent, or Firm* — CANTOR COLBURN LLP (57) ABSTRACT

A system and method of operating a vehicle. The system includes an inverter, a motor, and a sensor for measuring a phase current between the inverter and the motor in a first phase cycle in which the inverter is operated at a first voltage. A processor predicts an observed phase current and a raw disturbance voltage for the second phase cycle from the phase current, calculates a damping voltage correction for the second phase cycle from the observed phase current and a disturbance voltage correction for the second phase cycle from the raw disturbance voltage, calculates a final voltage in the second phase cycle from a core current regulator voltage, the damping voltage correction and the disturbance voltage correction, calculates a second voltage in the first phase cycle by applying a delay to the final voltage in the second phase cycle; and applies the second voltage at the inverter.

20 Claims, 7 Drawing Sheets

(51) Int. Cl.
*H02P 21/00* (2016.01)
*H02P 27/08* (2006.01)
(52) U.S. Cl.
CPC ......... *H02P 27/08* (2013.01); *B60L 2240/427* (2013.01); *B60L 2240/429* (2013.01)
(58) Field of Classification Search
CPC .... B60L 2240/429; B60L 15/32; B60L 15/20; B62D 5/0472; H02K 41/03; F02D 41/1401; F02D 2041/2058; F02D 41/20
See application file for complete search history.

ENHANCED DISTURBANCE REJECTION WITH NOISE IMMUNITY IN A CURRENT CONTROLLED ALTERNATING CURRENT MACHINE WITH USE OF CURRENT OBSERVER

INTRODUCTION

The subject disclosure relates to controlling operation of a motor of a vehicle and, in particular, to a system and method of using feedback from the motor to create a voltage for application at an inverter that controls the motor.

In controlling a motor of a vehicle, a control mechanism is used to design a voltage signal that can be used at an inverter that provide a phase current to the motor. Current methods tend to introduce noise in the voltage signal that causes disturbances at the motor. Accordingly, it is desirable to provide a system and method of designing a voltage signal for the inverter that does not amplify noise in the system.

SUMMARY

In one exemplary embodiment, a method of operating a vehicle is disclosed. A phase current is measured between and inverter of the vehicle and a motor of the vehicle in a first phase cycle of the motor in which the inverter is operated at a first voltage. An observed phase current is predicted for a second phase cycle of the motor and a raw disturbance voltage for the second phase cycle from the phase current. A damping voltage correction is calculated for the second phase cycle from the observed phase current. A disturbance voltage correction is calculated for the second phase cycle from the raw disturbance voltage. A final voltage is calculated in the second phase cycle from a core current regulator voltage, the damping voltage correction and the disturbance voltage correction. A second voltage is in the first phase cycle is calculated by applying a delay to the final voltage in the second phase cycle. The second voltage is applied at the inverter.

In addition to one or more of the features described herein, further includes converting the phase current to a dq-current and predicting the observed phase current and the raw disturbance voltage from the dq-current and a raw dq-voltage.

In addition to one or more of the features described herein, wherein calculating the disturbance voltage correction for the second phase cycle comprises applying a low-pass filter to the raw disturbance voltage.

In addition to one or more of the features described herein, further includes calculating the damping voltage correction from a virtual value of impedance of a virtually modified model of the motor.

In addition to one or more of the features described herein, wherein the damping voltage correction is bandwidth limited.

In addition to one or more of the features described herein, wherein the damping voltage correction is indicative of a low frequency disturbance in the phase current and the disturbance voltage correction is indicative of a high frequency disturbance in the phase current.

In addition to one or more of the features described herein, further includes predicting the observed phase current for the second phase cycle and the raw disturbance voltage for the second phase cycle using one of: (i) a complex vector model; and (ii) a state feedback model.

In another exemplary embodiment, an electrical system of a vehicle is disclosed. The electrical system includes an inverter, a motor, a sensor for measuring a phase current between the inverter and the motor in a first phase cycle in which the inverter is operated at a first voltage, and a processor. The processor is configured to predict an observed phase current for a second phase cycle of the motor and a raw disturbance voltage for the second phase cycle from the phase current, calculate a damping voltage correction for the second phase cycle from the observed phase current, calculate a disturbance voltage correction for the second phase cycle from the raw disturbance voltage, calculate a final voltage in the second phase cycle from a core current regulator voltage, the damping voltage correction and the disturbance voltage correction, calculate a second voltage in the first phase cycle by applying a delay to the final voltage in the second phase cycle, and apply the second voltage at the inverter.

In addition to one or more of the features described herein, wherein the processor is further configured to convert the phase current to a dq-current and predict the observed phase current and the raw disturbance voltage from the dq-current and a dq-voltage.

In addition to one or more of the features described herein, wherein the processor is further configured to calculate the disturbance voltage correction for the second phase cycle by applying a low-pass filter to the raw disturbance voltage.

In addition to one or more of the features described herein, wherein the processor is further configured to calculate the damping voltage correction from a virtual value of impedance of a virtually modified model of the motor.

In addition to one or more of the features described herein, wherein the processor is configured to operate a current observer and a current regulator, wherein a bandwidth of the current observer is bound from below by a function of bandwidth of the current regulator and virtually modified machine time constant.

In addition to one or more of the features described herein, wherein the damping voltage correction is indicative of a low frequency disturbance in the phase current and the disturbance voltage correction is indicative of a high frequency disturbance in the phase current.

In addition to one or more of the features described herein, wherein the processor is further configured to predict the observed phase current for the second phase cycle and the raw disturbance voltage for the second phase cycle using one of: (i) a complex vector model; and (ii) a state feedback model.

In yet another exemplary embodiment, a vehicle is disclosed. The vehicle includes an inverter, a motor, a sensor for measuring a phase current between the inverter and the motor in a first phase cycle in which the inverter is operated at a first voltage, and a processor. The processor is configured to predict an observed phase current for a second phase cycle of the motor and a raw disturbance voltage for the second phase cycle from the phase current, calculate a damping voltage correction for the second phase cycle from the observed phase current, calculate a disturbance voltage correction for the second phase cycle from the raw disturbance voltage, calculate a final voltage in the second phase cycle from a core current regulator voltage, the damping voltage correction and the disturbance voltage correction, calculate a second voltage in the first phase cycle by applying a delay to the final voltage in the second phase cycle, and apply the second voltage at the inverter.

In addition to one or more of the features described herein, wherein the processor is further configured to convert the phase current to a dq-current and predict the observed phase current and the raw disturbance voltage from the dq-current and a raw dq-voltage.

In addition to one or more of the features described herein, wherein the processor is further configured to calculate the disturbance voltage correction for the second phase cycle by applying a low-pass filter to the raw disturbance voltage.

In addition to one or more of the features described herein, wherein the processor is further configured to calculate the damping voltage correction from a virtual value of impedance of a virtually modified model of the motor.

In addition to one or more of the features described herein, wherein the processor is configured to operate a current observer and a current regulator, wherein a bandwidth of the current observer is bound from below by a function of bandwidth of the current regulator and virtually modified machine time constant.

In addition to one or more of the features described herein, wherein the damping voltage correction is indicative of a low frequency disturbance in the phase current and the disturbance voltage correction is indicative of a high frequency disturbance in the phase current.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
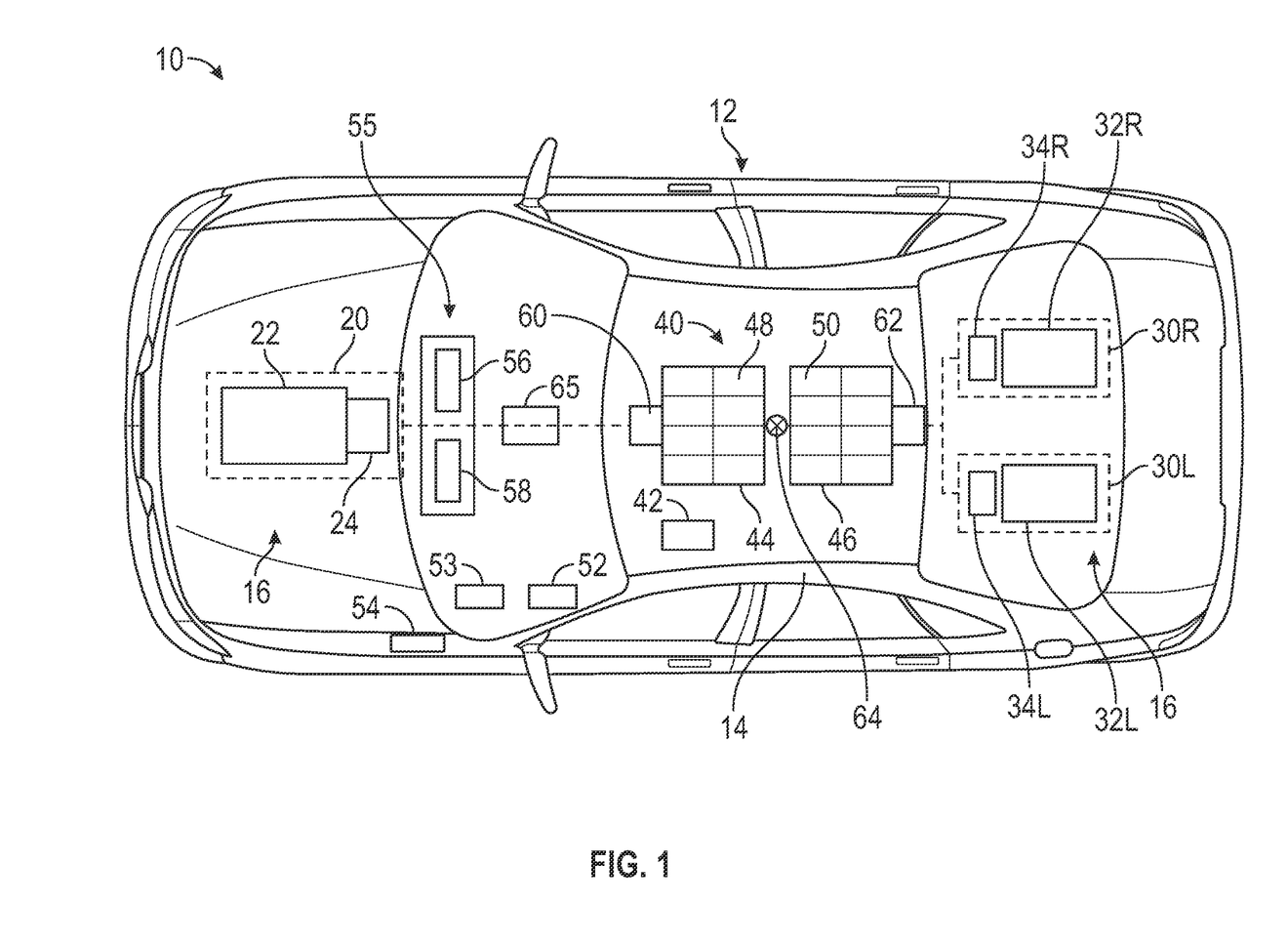
FIG. 1 shows a vehicle in accordance with an exemplary embodiment.

In accordance with an exemplary embodiment, FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to a battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery.

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC).

In an embodiment, the switching system includes a first switching device 60 that selectively connects to the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit and may use an existing controller such as a drive system controller, an RESS controller, and/or controllers in the drive system. For example, a controller 65 may be included for controlling switching and drive control operations as discussed herein.

The controller may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller may include a non-transitory computer-readable medium that stores instructions which, when processed by one or more processors of the controller, implement a method of determining a voltage to be applied at an inverter of the electric vehicle, according to one or more embodiments detailed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In an alternative embodiment, the vehicle 10 can be an internal combustion engine vehicle, a hybrid vehicle, etc.

Figure 2:
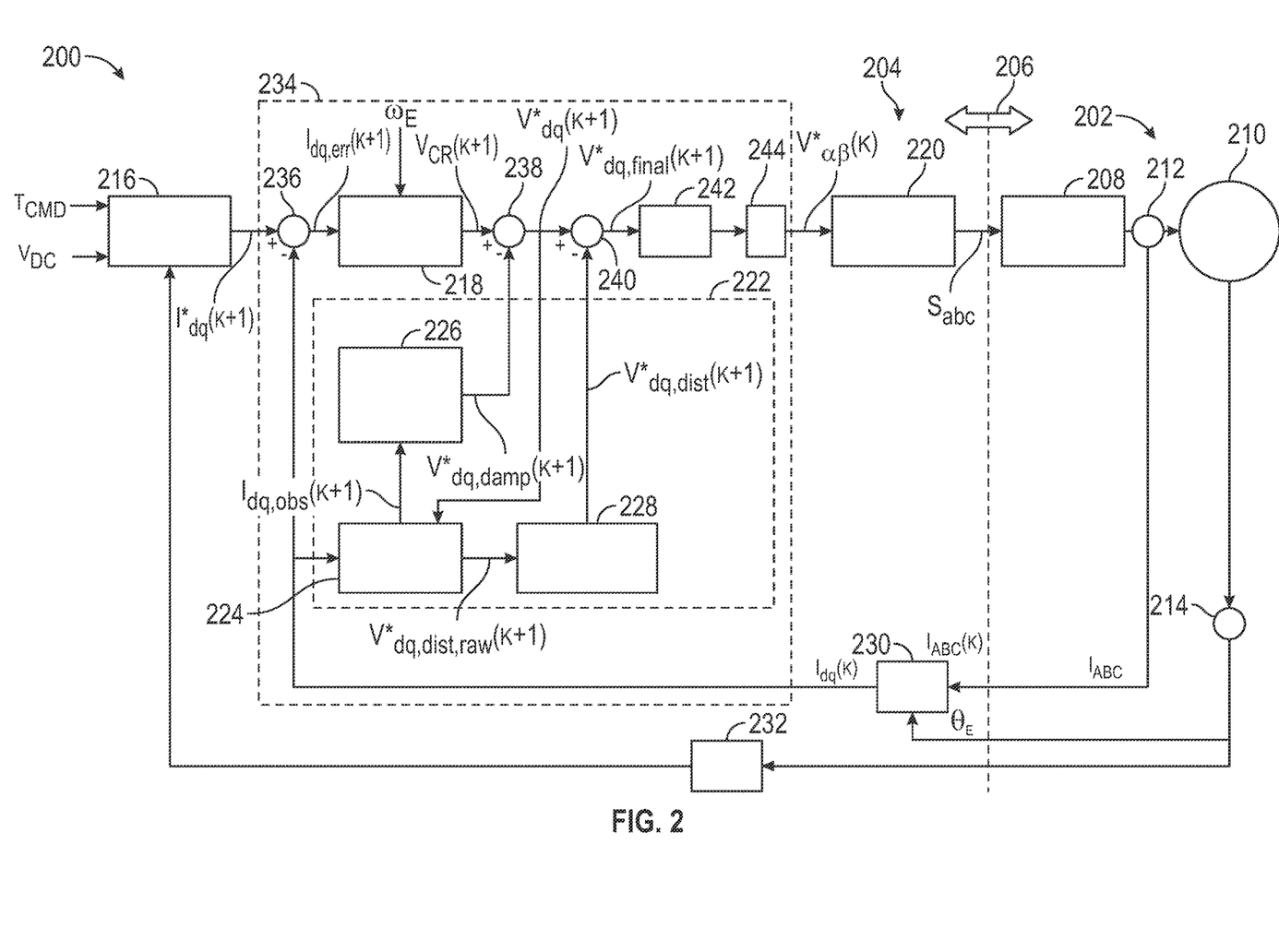
FIG. 2 is a diagram depicting a flow of operations for controlling the electrical system of the vehicle.

FIG. 2 is a diagram 200 depicting a flow of operations for controlling the electrical system of the vehicle. The electrical system includes a hardware portion shown by physical system 202 and a software portion shown by a discrete control system 204 as separated by interface 206. The physical system 202 includes an inverter 208 and an electric motor 210. The inverter 208 provides a phase current to the motor 210 to control operation of the motor. Typically, the phase current is a three-phase current supplied over three phase separate windings (a, b, c) with the currents being out of phase with each other by 120° (or $2\pi/3$). The physical system 202 further includes a current sensor 212 for detecting the phase currents ($I_a$, $I_b$, $I_c$, or $I_{abc}$) along the phase windings, and a position sensor 214 for detecting a motor position, or a position of a rotor within the electric motor 210.

The discrete control system 204 applies a voltage signal to the inverter at each of a plurality of phase cycles, labeled by time steps (k, k+1, k+2, ...). A voltage applied at the next time step (k+1) is determined by current error $I_{dq,err}(k+1)$ and predicting a bandwidth limited voltage for a subsequent time step or next time step (e.g., second time step k+1). Determining the bandwidth limited voltage for the subsequent time step includes removing a high frequency component and a low frequency component, as disclosed herein.

The discrete control system 204 includes algorithm modules for generating a voltage signal that can be used to control operation of the inverter 208. The discrete control system 204 receives current and rotor position data form the physical system 202 and determines a voltage that can be applied to the inverter 208 to dampen any disturbances or noise in the currents applied to the motor 210. The algorithm modules include a command generation module 216, a core current regulator 218, and a pulse width modulated generator module (PWM generator 220) for providing a voltage signal for operating the inverter 208.

The discrete control system 204 also includes feedback modules 222 for providing corrections to the voltage signal sent to the inverter 208. The feedback modules include a current observer 224, an immediate virtual impedance damping module 226 and a disturbance decoupling module 228. Additionally, the feedback modules include a park transform block 230 and a time differentiation module 232. The park transform block 230 converts the phase currents $I_{abc}$ into discretized current values in the direct axis (d-axis) and quadrature axis (q-axis) of a rotor of the motor 210. The park transform block 230 performs the transformation using the motor position Oe. The time differentiation module 232 outputs a motor speed we based on measurements of the rotor position.

Modules enclosed by dashed line 234 perform calculations on current and voltage values as seen in rotating coordinate system (i.e., the dq-coordinate system of the rotor). These modules include the core current regulator 218, the current observer 224, the intermediate virtual impedance damping module 226 and the disturbance decoupling module 228.

The command generation module 216 receives a torque command $T_{cmd}$, a measured battery voltage $V_{dc}$, and the motor speed $\omega_e$ and outputs a commanded current $I^*_{dq}(k+1)$ in the dq-coordinate system at a next time step k+1, where the asterisk indicates a commanded value. The next time step k+1 represents a time step immediately following the present time step k.

A current difference calculator 236 determines an error current $I_{dq,err}(k+1)$ at the next time step between the commanded current $I^*_{dq}(k+1)$ at the next time step and a present dq-current $I_{dq}(k)$, as shown in Eq. (1):

$$I_{dq,err}(k+1) = I^*_{dq}(k+1) - I_{dq}(k) \qquad \text{Eq. (1)}$$

The park transformation block 230 outputs the current dq-current $I_{dq}(k)$ at the present time step k.

The error current $I_{dq,err}(k+1)$ at the next time step is input to the core current regulator 218. The core current regulator 218 receives the error current $I_{dq,err}(k+1)$ and the rotor speed co and outputs a core voltage $V_{CR}(k+1)$ predicted for the next time step.

The core voltage $V_{CR}(k+1)$ is modified by a damping voltage $V_{dq,damp}^*(k+1)$ at a damping correction node 238 to obtain a raw dq-voltage $V_{dq}^*(k+1)$, as shown in Eq. (2):

$$V_{dq}^*(k+1) = V_{CR}(k+1) - V_{dq,damp}^*(k+1) \qquad \text{Eq. (2)}$$

The damping correction node 238 thereby removes high frequency noise or disturbances for the commanded voltage. The damping voltage is provided by the immediate virtual impedance damping module 226.

The raw dq-voltage is modified by a disturbance voltage at disturbance correction node 240 to obtain a final dq-voltage $V_{dq,final}^*(k+1)$ at the next time step, as shown in Eq. (3):

$$V_{dq,final}^*(k+1) = V_{dq}^*(k+1) - V_{dq,dist}^*(k+1) \qquad \text{Eq. (3)}$$

The disturbance correction node 240 removes low frequency noise or disturbances from the commanded voltage. The disturbance voltage $V_{dq,dist}^*(k+1)$ is provided by the disturbance decoupling module 228.

Block 242 performs a transformation on the final commanded voltage $V_{dq,final}^*(k+1)$ at the next time step to obtain a final command voltage $V_{\alpha\beta}(k+1)$ at the next time step in a stationary coordinate system. A delay module 244 provides a delay of the final command voltage $V_{\alpha\beta}(k+1)$ at the next time step to generate a command voltage $V_{\alpha\beta}(k)$ in the stationary frame at the present time step. The delay is modelled on a delay of the PWM generator 220. Based on the command voltage $V_{\alpha\beta}^*(k)$, the PWM generator 220 outputs a voltage signal $S_{abc}$ in the abc-coordinate system to the inverter 208.

The feedback modules 222 are now discussed. The current observer 224 receives as input the actual dq-current $I_{dq}(k)$ at the present time step and the raw dq-voltage $V_{dq}^*(k+1)$ at the next time step. The current observer module 224 outputs a bandwidth-limited observer current $I_{dq,obs}(k+1)$ for the next time-step and a raw disturbance voltage $V_{dq,dist,raw}(k+1)$ for next time-step. A bandwidth of the current observer module 224 is related to a bandwidth of the core current regulator 218 and a modified time constant as shown in Eq. (4):

$$f_{b,CO} \geq \sqrt{2 * f_{b,CR} * \tau_{mod}^{-1}} \qquad \text{Eq. (4)}$$

where $f_{b,CO}$ is the bandwidth of the current observer, $f_{b,CR}$ is the bandwidth of the core current controller and $\tau_{mod}$ is the modified time constant. The modified time constant is the ratio of the virtually modified inductance to the virtually modified resistance.

The bandwidth-limited observer current $I_{dq,obs}(k+1)$ at the next time step is input to the immediate virtual impedance damping module 226 which outputs the damping voltage $V_{dq,damp}^*(k+1)$. The raw disturbance voltage is input to the disturbance decoupling module 228 which outputs the disturbance voltage $V_{dq,dist}^*(k+1)$ at the next time step.

Figure 3:
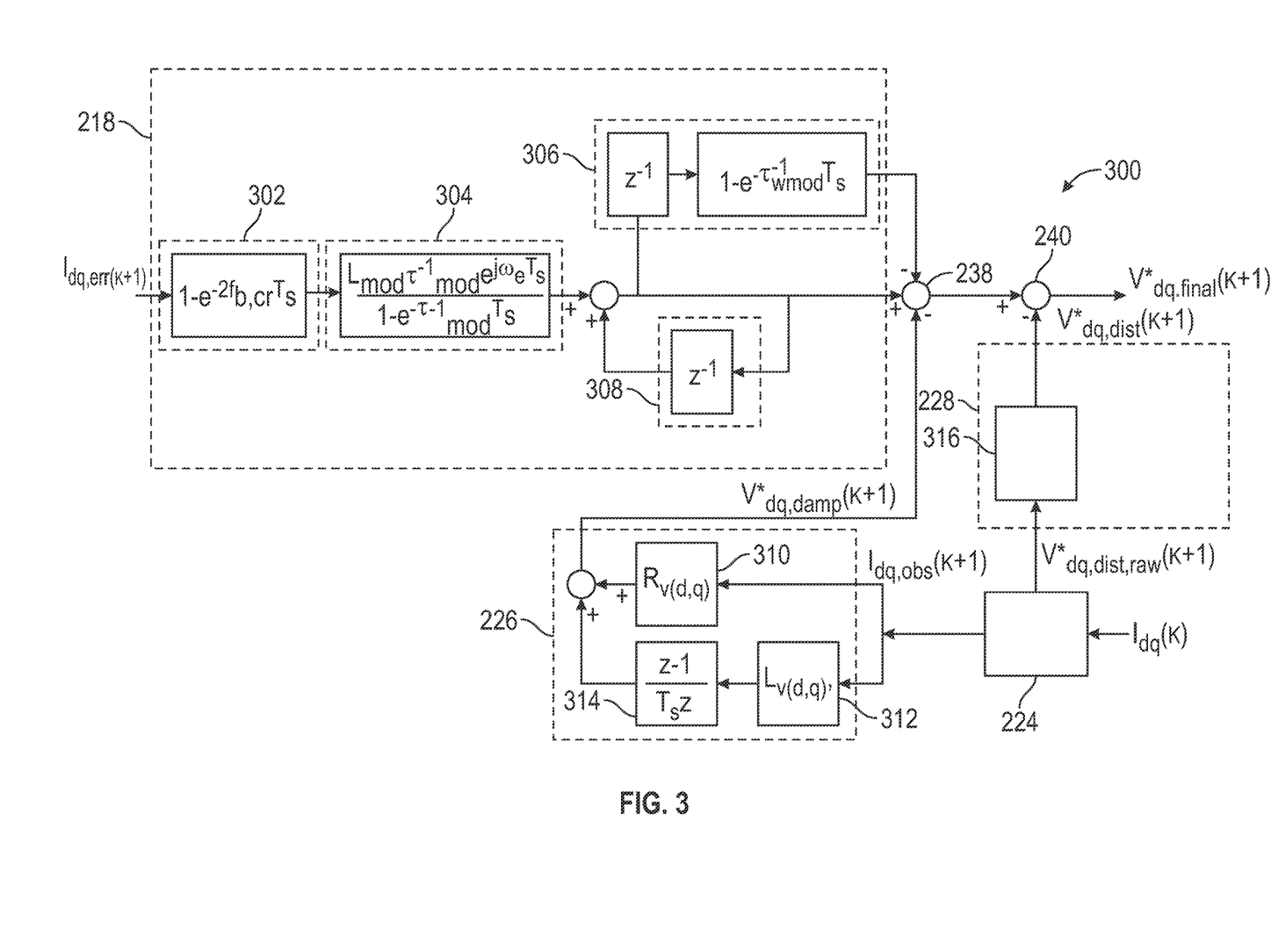
FIG. 3 is a diagram depicting operation of the feedback modules with the core current regulator, in an illustrative embodiment.

FIG. 3 is a diagram 300 depicting operation of the feedback modules with the core current regulator, in an illustrative embodiment. The core current regulator 218 includes a normalized gain module 302, an input decoupling module 304, a plant pole cancellation module 306, and a pure accumulator module 308. The normalized gain module 302 determines how fast torque is achieved at the motor. The input decoupling module 304 separates the current into a d-axis current along the direct axis and a q-axis current along the quadrature axis. The input decoupling module 304 includes a mathematical expression that is an inverse of the virtually modified plant model (i.e., motor module). A virtually modified model is a model that has modified time constants based on virtual inductance $L_v$ and virtual resistance $R_v$. The plant pole cancellation 306 module replaces poles of the inverse plant model. The pure accumulator module 308 integrates currents.

The immediate virtual impedance damping module 226 includes a virtual resistance module 310 and a virtual inductance module 312. The virtual resistance module 310 applies a resistive damping to the observer current $I_{dq,obs}(k+1)$ to obtain a resistance damped voltage. The virtual inductance module 312 applies an inductive damping to the observer current $I_{dq,obs}(k+1)$. A derivative module 314 performs a derivative on the inductive damping to create an inductive damped voltage. The resistive damped voltage and the inductive damped voltage are combined to create the damping volage $V_{dq,damp}^*(k+1)$.

The disturbance decoupling module 228 includes a low pass filter 316. The low pass filter 316 is applied to the raw disturbance voltage $V_{dq,dist,raw}^*(k+1)$ to thereby create the disturbance voltage $V_{dq,dist}^*(k+1)$.

Figure 4:
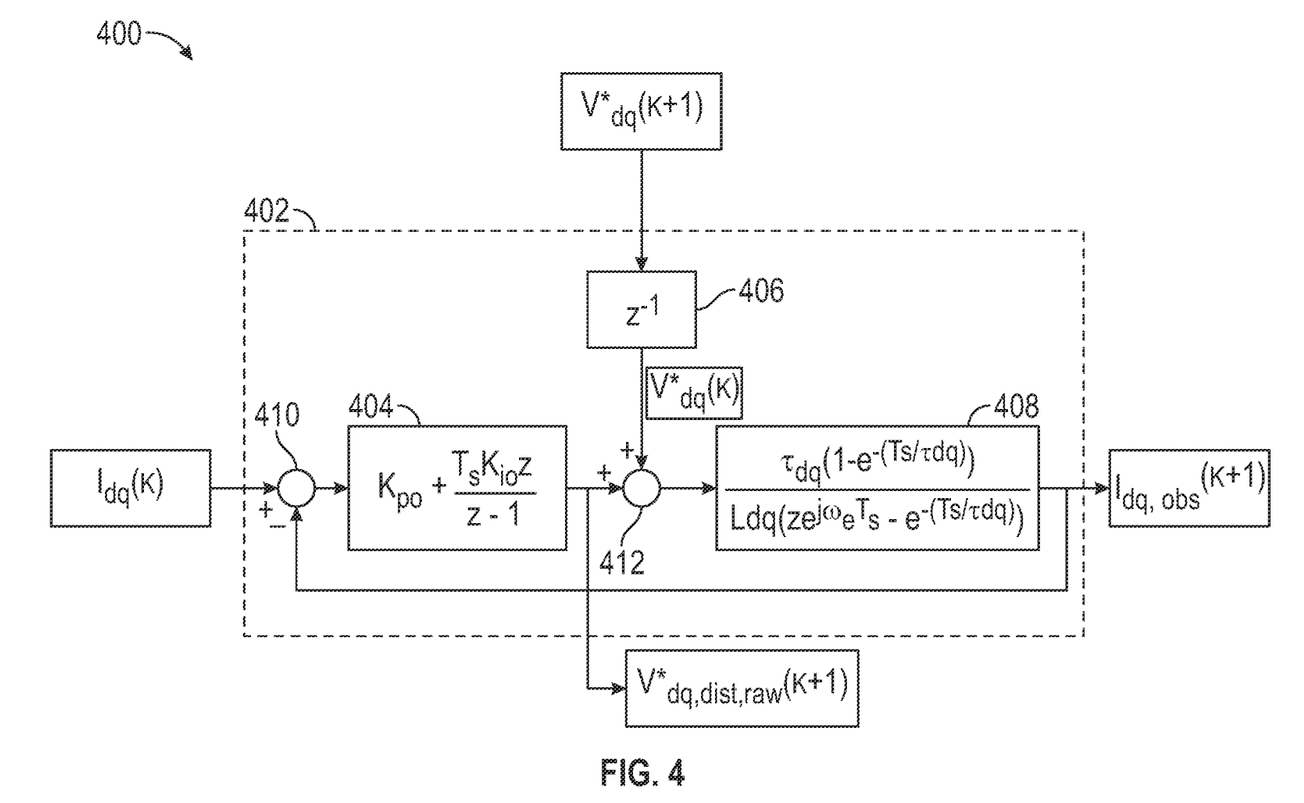
FIG. 4 is a diagram depicting operation of a complex vector type current observer, in an illustrative embodiment.

FIG. 4 is a diagram 400 depicting operation of a complex vector type current observer 402, in an illustrative embodiment. The complex vector type current observer 402 includes a proportional and integral controller module (PI controller module 404), a delay module 406 and a plant model 408.

The current observer 402 receives the dq-current $I_{dq}(k)$ at a current time step and the raw dq-voltage $V_{dq}^*(k+1)$ at the next time step.

Current error calculator 410 determines an error current between the dq-current $I_{dq}(k)$ at the present time step and a predicted observed dq-current $I_{dq,obs}(k+1)$ at the next time step. The error current is input to the disturbance voltage module 404. The disturbance voltage module 404 calculates a raw disturbance dq-voltage $V_{dq,dist,raw}^*(k+1)$ for the next time step, which can be sent to the disturbance decoupling module (228, FIG. 2).

The delay block 406 receives the raw dq-voltage $V_{dq}^*(k+1)$ of the next time step (which is calculated at damping correction node 238 (FIG. 2) and outputs a commanded dq-voltage $V_{dq}*(k)$. A voltage summation node 412 adds the raw disturbance dq-voltage $V_{dq,dist,raw}*(k+1)$ for the next time step to the commanded dq-voltage $V_{dq}*(k)$. The output of the voltage summation node 412 is input to the plant model 408, which outputs the observer dq-current $I_{dq,obs}(k+1)$ for the next time step. The observed dq-current $I_{dq,obs}(k+1)$ for the next time step is sent to the immediate virtual impedance damping module 226, FIG. 2 and will be used at the current error computation node 410 to calculate a current error for the next time step.

Figure 5:
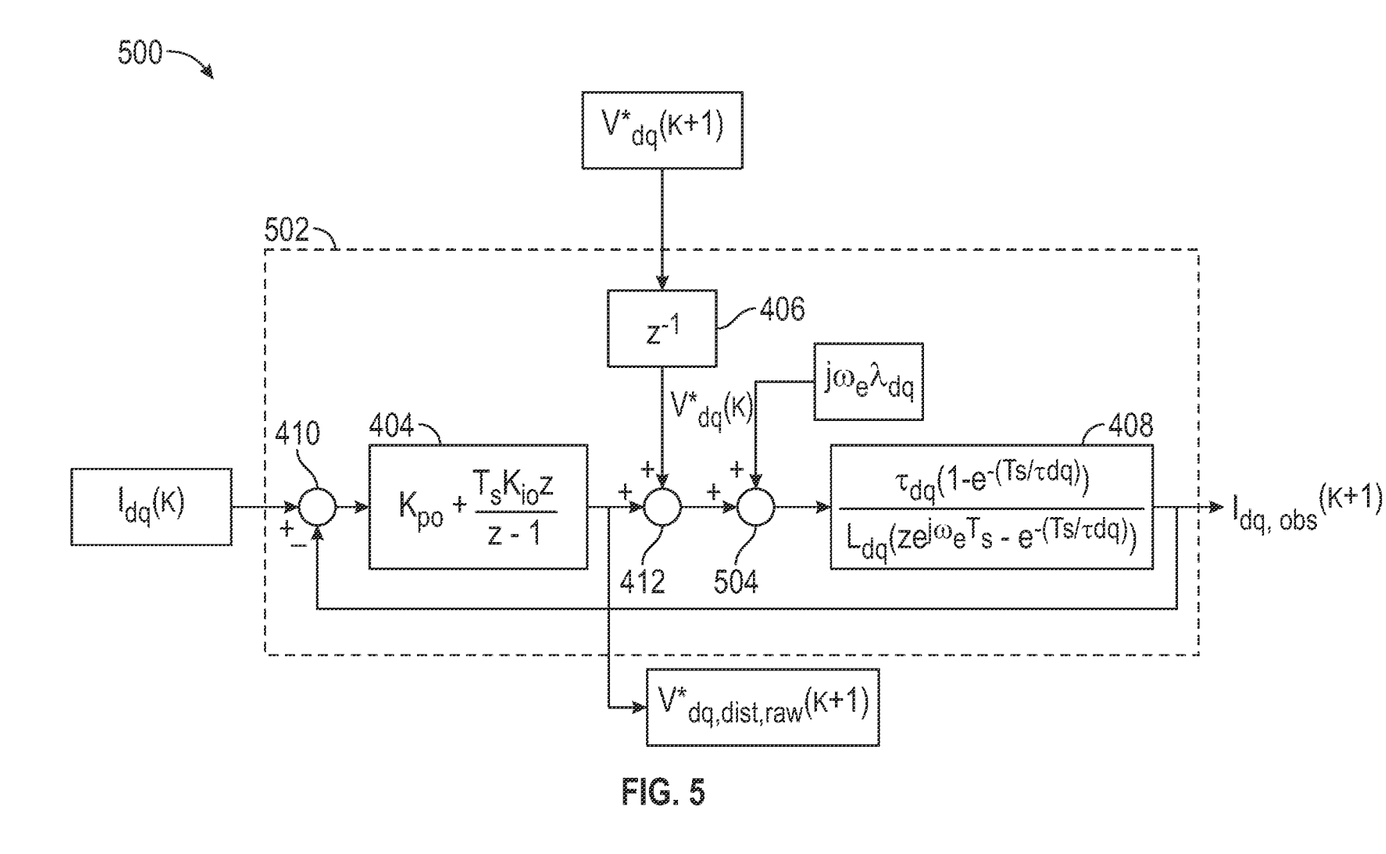
FIG. 5 is a diagram depicting operation of a state feedback type current observer, in an illustrative embodiment.

FIG. 5 is a diagram 500 depicting operation of a state feedback type current observer 502, in an illustrative embodiment. State feedback type current observer 502 includes the PI controller module 404, the delay module 406 and the plant model 408. In addition, a $B_{EMF}$ sum calculator 504 is used between the voltage summation node 412 and the plant model 408 to include a dq-flux voltage $j\omega_e\lambda_{dq}$ at the input to the plant model 408.

Figure 6:
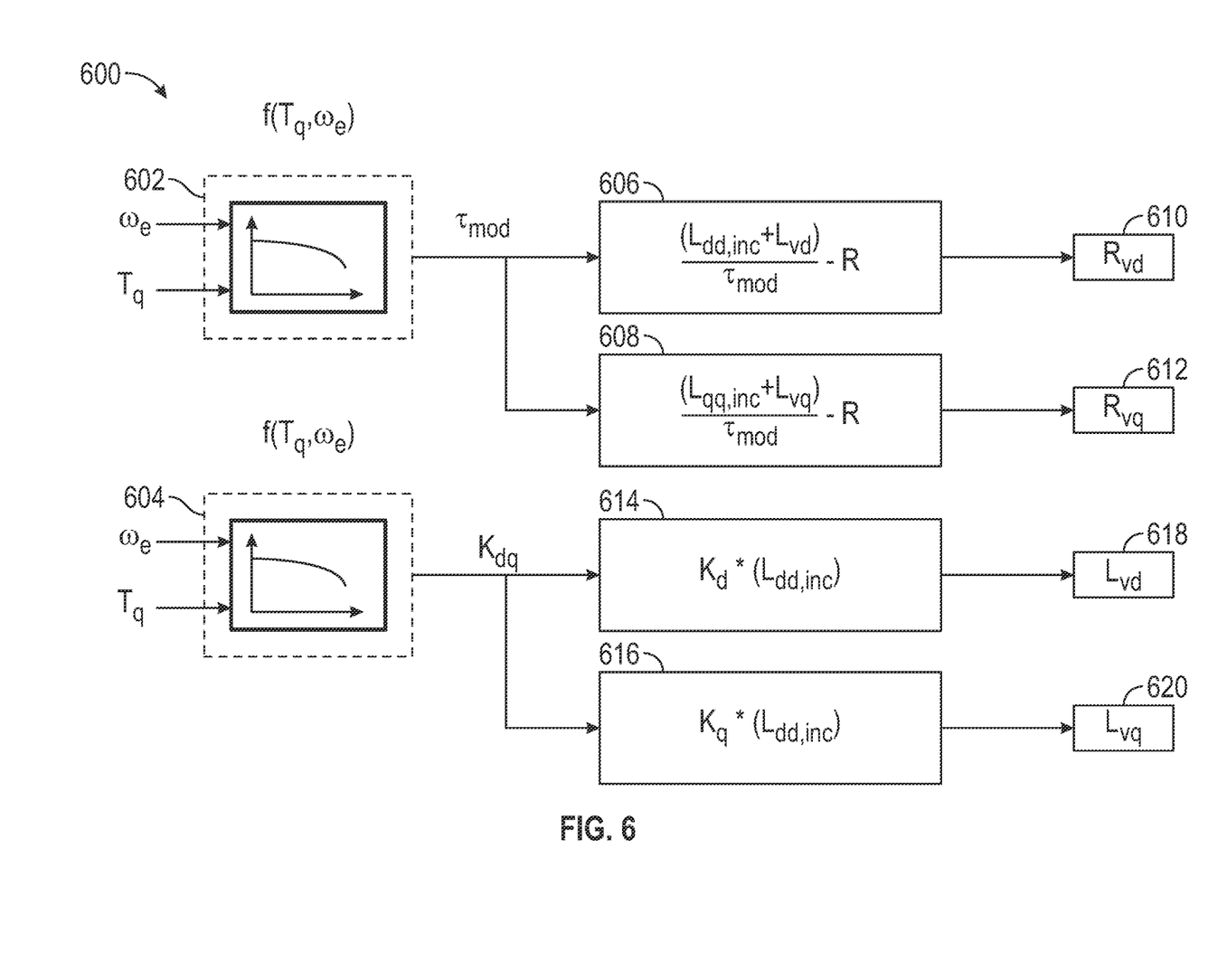
FIG. 6 shows a block diagram for determining a virtual resistance vector and a virtual impedance vector that can be used at the impedance damping module.

FIG. 6 shows a block diagram 600 for determining a virtual resistance vector and a virtual impedance vector that can be used at the impedance damping module 226. The block diagram 600 includes a first lookup table 602 and a second lookup table 604. The first lookup table 602 receives a motor speed ωe and a commanded torque $T_q$ and outputs a virtually modified target time constant $(\tau_{mod})$. The time constant is input to a first resistance block 606 to generate a virtual resistance along the d-axis $(R_{vd})$, 610, and input to a second resistance block 608 to generate a virtual resistance along the q-axis $(R_{vq})$, 612. The virtual resistance along the d-axis $(R_{vd})$ 610 and the virtual resistance along the q-axis $(R_{vq})$ 612 are provided to the virtual resistance module 310 shown in FIG. 3.

The second lookup table 604 receives a motor speed co and a commanded torque $T_q$ and outputs a constant multiplier vector $K_{dq}$. The constant multiplier $K_{dq}$ is input to a first inductance block 614 to generate a virtual inductance along the d-axis $(L_{vd})$, 618, and at a second inductance block 616 to generate a virtual inductance along the q-axis $(L_{vq})$, 620. The virtual inductance along the d-axis $(L_{vd})$ 618 and the virtual inductance along the q-axis $(L_{vq})$ 620 are provided to the virtual inductance module 312 of FIG. 3.

Figure 7:
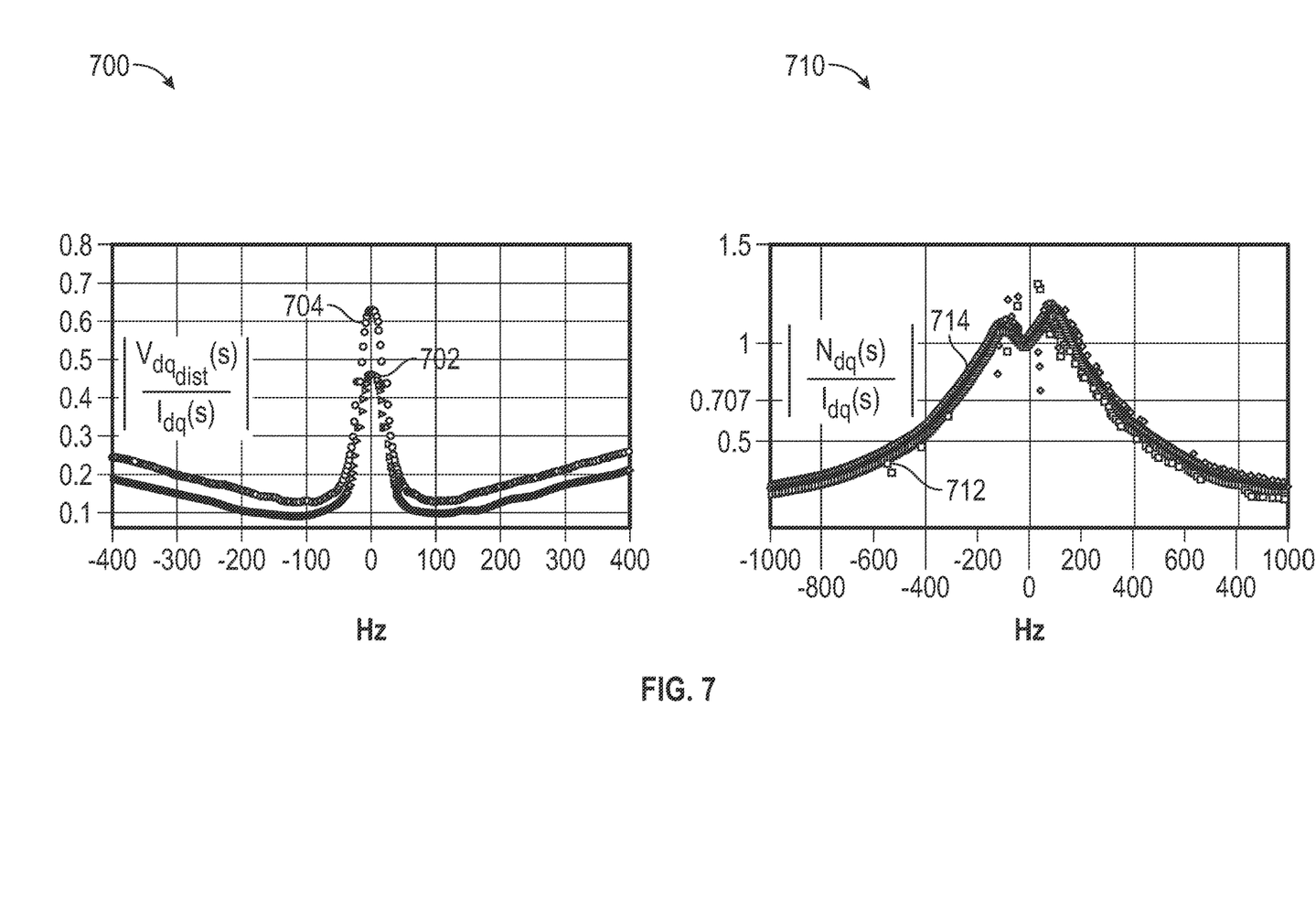
FIG. 7 shows the results of the implementing the feedback modules shown in FIG. 2.

FIG. 7 shows the results of the implementing the feedback modules 224 shown in FIG. 2. A first graph 700 shows a dynamic stiffness with respect to frequency. Frequency is shown along the abscissa and dynamic stiffness is shown along the ordinate axis. A first curve 702 shows a baseline stiffness at a motor torque of 50 Newton-meters (Nm) and a motor speed of 100 rotations per minute (RPM). A second curve 704 shows a stiffness achieved using the feedback modules 224. The second curve 704 shows that the dynamic stiffness is increased at all frequencies.

A second graph 710 shows a noise gain with respect to frequency. Frequency is shown along the abscissa and noise gain is shown along the ordinate axis. A third curve 712 shows a baseline noise at a motor torque of 50 Newton-meters (Nm) and a motor speed of 100 rotations per minute (RPM). A fourth curve 714 shows a noise achieved using the feedback modules 224. Comparing the third curve 72 and the fourth curve 714, the noise remains at the baseline noise at all frequencies even though dynamic stiffness (second curve 704) is increased at all frequencies.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
measuring a phase current between an inverter of the vehicle and a motor of the vehicle in a first phase cycle of the motor in which the inverter is operated at a first voltage;
predicting an observed phase current for a second phase cycle of the motor and a raw disturbance voltage for the second phase cycle from the phase current;
calculating a damping voltage correction for the second phase cycle from the observed phase current;
calculating a disturbance voltage correction for the second phase cycle from the raw disturbance voltage;
calculating a final voltage in the second phase cycle from a core current regulator voltage, the damping voltage correction and the disturbance voltage correction;
calculating a second voltage in the first phase cycle by applying a delay to the final voltage in the second phase cycle; and
applying the second voltage at the inverter.

2. The method of claim 1, further comprising converting the phase current to a dq-current and predicting the observed phase current and the raw disturbance voltage from the dq-current and a raw dq-voltage.

3. The method of claim 1, wherein calculating the disturbance voltage correction for the second phase cycle comprises applying a low-pass filter to the raw disturbance voltage.

4. The method of claim 1, further comprising calculating the damping voltage correction from a virtual value of impedance of a virtually modified model of the motor.

5. The method of claim 1, wherein the damping voltage correction is bandwidth limited.

6. The method of claim 1, wherein the damping voltage correction is indicative of a low frequency disturbance in the phase current and the disturbance voltage correction is indicative of a high frequency disturbance in the phase current.

7. The method of claim 1, further comprising predicting the observed phase current for the second phase cycle and the raw disturbance voltage for the second phase cycle using one of: (i) a complex vector model; and (ii) a state feedback model.

8. An electrical system of a vehicle, comprising:
an inverter;
a motor;
a sensor for measuring a phase current between the inverter and the motor in a first phase cycle in which the inverter is operated at a first voltage; and
a processor configured to:
predict an observed phase current for a second phase cycle of the motor and a raw disturbance voltage for the second phase cycle from the phase current;
calculate a damping voltage correction for the second phase cycle from the observed phase current;
calculate a disturbance voltage correction for the second phase cycle from the raw disturbance voltage;
calculate a final voltage in the second phase cycle from a core current regulator voltage, the damping voltage correction and the disturbance voltage correction;
calculate a second voltage in the first phase cycle by applying a delay to the final voltage in the second phase cycle; and
apply the second voltage at the inverter.

9. The electrical system of claim 8, wherein the processor is further configured to convert the phase current to a dq-current and predict the observed phase current and the raw disturbance voltage from the dq-current and a dq-voltage.

10. The electrical system of claim 8, wherein the processor is further configured to calculate the disturbance voltage correction for the second phase cycle by applying a low-pass filter to the raw disturbance voltage.

11. The electrical system of claim 8, wherein the processor is further configured to calculate the damping voltage correction from a virtual value of impedance of a virtually modified model of the motor.

12. The electrical system of claim 8, wherein the processor is configured to operate a current observer and a current regulator, wherein a bandwidth of the current observer is bound from below by a function of bandwidth of the current regulator and virtually modified machine time constant.

13. The electrical system of claim 8, wherein the damping voltage correction is indicative of a low frequency disturbance in the phase current and the disturbance voltage correction is indicative of a high frequency disturbance in the phase current.

14. The electrical system of claim 8, wherein the processor is further configured to predict the observed phase current for the second phase cycle and the raw disturbance voltage for the second phase cycle using one of: (i) a complex vector model; and (ii) a state feedback model.

15. A vehicle, comprising:
an inverter;
a motor;
a sensor for measuring a phase current between the inverter and the motor in a first phase cycle in which the inverter is operated at a first voltage; and
a processor configured to:
predict an observed phase current for a second phase cycle of the motor and a raw disturbance voltage for the second phase cycle from the phase current;
calculate a damping voltage correction for the second phase cycle from the observed phase current;
calculate a disturbance voltage correction for the second phase cycle from the raw disturbance voltage;
calculate a final voltage in the second phase cycle from a core current regulator voltage, the damping voltage correction and the disturbance voltage correction;
calculate a second voltage in the first phase cycle by applying a delay to the final voltage in the second phase cycle; and
apply the second voltage at the inverter.

16. The vehicle of claim 15, wherein the processor is further configured to convert the phase current to a dq-current and predict the observed phase current and the raw disturbance voltage from the dq-current and a raw dq-voltage.

17. The vehicle of claim 15, wherein the processor is further configured to calculate the disturbance voltage correction for the second phase cycle by applying a low-pass filter to the raw disturbance voltage.

18. The vehicle of claim 15, wherein the processor is further configured to calculate the damping voltage correction from a virtual value of impedance of a virtually modified model of the motor.

19. The vehicle of claim 15, wherein the processor is configured to operate a current observer and a current regulator, wherein a bandwidth of the current observer is bound from below by a function of bandwidth of the current regulator and virtually modified machine time constant.

20. The vehicle of claim 15, wherein the damping voltage correction is indicative of a low frequency disturbance in the phase current and the disturbance voltage correction is indicative of a high frequency disturbance in the phase current.

* * * * *